Figure 1:
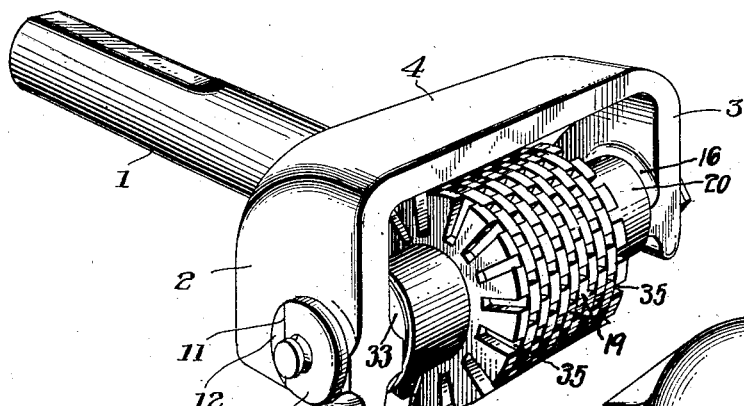

R. P. PLACE.
GRINDING WHEEL DRESSER.
APPLICATION FILED FEB. 10, 1919.

1,347,519.

Patented July 27, 1920.

INVENTOR.

Roland P. Place,

BY

ATTORNEYS

UNITED STATES PATENT OFFICE.

ROLAND P. PLACE, OF DETROIT, MICHIGAN, ASSIGNOR TO THE H-P COMPANY, OF DETROIT, MICHIGAN, A CORPORATION OF MICHIGAN.

GRINDING-WHEEL DRESSER.

1,347,519.  Specification of Letters Patent.  Patented July 27, 1920.

Application filed February 10, 1919. Serial No. 276,055.

*To all whom it may concern:*

Be it known that I, ROLAND P. PLACE, a citizen of the United States, and residing at Detroit, in the county of Wayne and State of Michigan, have invented a new and Improved Grinding-Wheel Dresser, of which the following is a specification.

The present invention has reference primarily to the type of grinding wheel dresser disclosed and claimed in United States Letters Patent No. 1,276,366, granted August 20, 1918, to John E. Hoy and myself.

One of its objects is to provide a tool of this nature wherein the bearings are more completely housed than heretofore, thus excluding chips and emery dust from the wearing surfaces. Again, the invention provides for a free feeding of oil to the bearings through the centrifugal action of the tool, as well as for a pocketing of the oil in the space surrounding the bearings, whereby efficient lubrication is secured without waste.

Another object is to provide an inexpensive and efficient construction wherein the ball bearings may be adjusted longitudinally of the axis of the tool to insure proper initial adjustment and to take up wear.

The invention also provides for holding the longitudinally adjustable shaft from rotation without the necessity of resorting to the relatively expensive keys and the like ordinarily employed for such purposes.

The invention further provides a cutter capable of performing a substantially uniform finishing action regardless of the depth to which it may be worn away.

To the end of attaining these and other objects the nature of which will appear later, the invention consists in a cutter or the like having housed in its end portions anti-friction bearings protected and retained by disks or the like, the outer or edge surfaces of which form oil-tight joints with the bearing housings; it also consists in a shaft mounting for the tool so arranged that when the shaft is adjusted longitudinally in its support pressure is applied to the inner races of the ball bearings to force them toward each other to take up wear and to establish initial alinement; it also consists in a construction of the nature just stated wherein the adjusting pressure is applied to the inner races by means of washers or collars that closely fit the end surfaces of the protecting disks or element, without exerting any appreciable pressure thereon, thereby establishing an additional seal for the exclusion of dirt and permitting free rotation of the tool.

The invention further consists in a shaft having a shoulder through which adjusting pressure is applied to the inner race at one end of the tool.

Again, the invention consists in a rigid cutter made up of toothed disks so positioned in reference to each other as to form helices, and so constructed that the notches between adjacent teeth of any particular disk are of substantially the same width circumferentially of the disk throughout their depth.

The invention also consists in various other details of construction and relative arrangements of parts shown, described and claimed.

Figure 2:
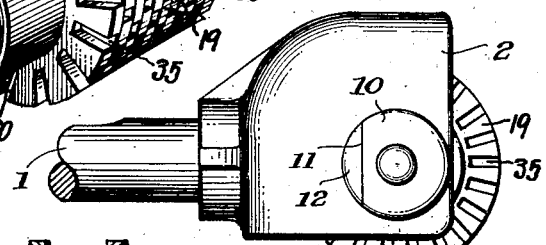
Figure 3:
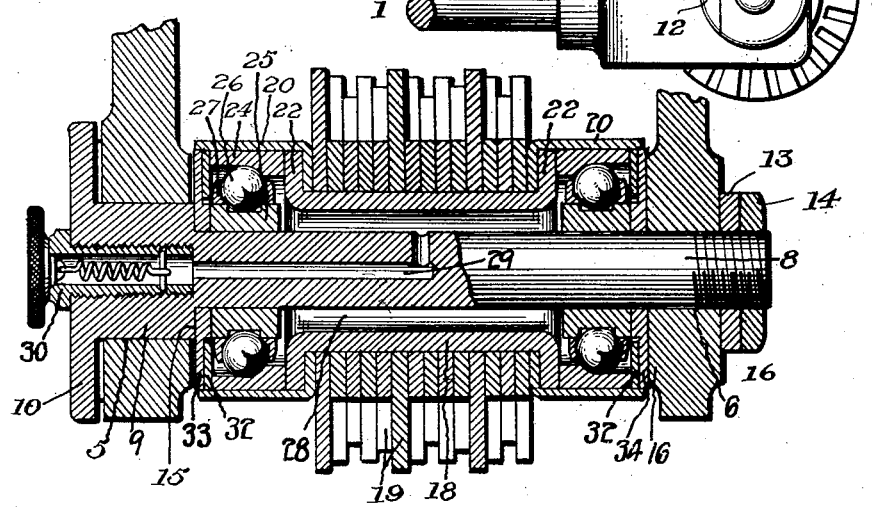

In the drawings, Figure 1 is a perspective view showing a preferred embodiment of the invention. Fig. 2 is a fragmentary side elevation corresponding thereto. Fig. 3 is a central vertical section through the axis of the cutter.

1 indicates any suitable handle that may be either separate from or integral with a head, the latter of which preferably includes two spaced arms or end walls 2—3 joined at the top and rear by the wall 4, thereby forming a chamber in which the working cutter may revolve and from which the chips are prevented from flying. These arms are pierced respectively at 5 and 6 to receive the main portion 8 and the larger cylindrical end portion 9 of a cutter shaft that also preferably comprises the head 10 one side of which is cut away at 11 to engage a lug 12 on the wall 2 which serves to prevent the shaft from turning about its own axis. The nuts 13—14 constitute means for both adjusting the shaft along its own axis and for locking it in proper position. It will be observed that there is some clearance between the inner face of the head 10 and the wall 2, also that the shaft has a shoulder 15, and that the wall 3 is provided with a boss 16.

In the particular construction shown, the cutter comprises a tubular member or spool 18 on which are mounted a series of cutter disks 19 that are so held in respect to each other as to cause their teeth to form helical lines—this may be conveniently accomplished in the manner indicated in said patent. The cutter also includes the cup-shaped bearing housings 20 the end walls of which are interposed between the end flanges 22 of the spool and the adjacent cutter disks, it being understood that the parts are assembled and held rigidly together by bending the flanges 22 down into the cups under heavy pressure.

Positioned in each housing 20 is a ball bearing which may be of well known construction and which, in the embodiment indicated, includes the outer race 24, the inner race 25, the balls 26 and the ball-holder or retainer 27. It will be observed that the spool is spaced somewhat from the shaft to afford a chamber 28, to which lubricating oil may be admitted through the passage 29 and oiling device 30, and that oil in this chamber will naturally be fed out into the bearings by centrifugal action.

Were no means provided to prevent it, it is evident that the oil would be thrown from the bearings as the tool continued to revolve, and I therefore press into the ends of the housings 20 thin walls 32 which fit tightly so as to form oil-tight joints with the inner surfaces of the housings, and to constitute, in effect, permanent end walls therefor. Pockets are thus formed at each end wherein the bearings run in oil, and the construction moreover of itself quite effectually prevents chips and emery dust from working into the bearings.

It will be noticed that the housings so project somewhat beyond the walls 32 and that the inner edges of the latter are spaced somewhat from the shaft: this space is utilized for the reception of collars 33—34 that project through the walls 32 and engage the inner race of the corresponding bearing. The collar 33 is adapted to be engaged by the shoulder 15 on the shaft, and the collar 34 is adapted to bear on the boss 16, consequently when the nuts 13—14 are tightened to draw the shaft endwise, within the limits of the clearance under the head 10, the inner races are forced toward each other to seat the balls properly in the races, and accurate adjustment may at all times be readily secured. The collars 33—34, which do not ordinarily rotate, conform to the shaft and afford a further seal against the admission of dirt, although they are held very slightly away from the walls 32 by contact with the inner races and thus do not interfere with free rotation of the cutter.

By forming the notches 35 in the cutter disks of substantially uniform width circumferentially of the particular disk from top to bottom or throughout their depth, I have discovered that a substantially uniform finishing action on the grinding wheel may be secured regardless of the amount of the wheel which may be worn away.

It is evident that certain features of the invention may be applied to wheel dressing tools wherein the cutter is widely different from that shown; in fact, rotating elements such as wheels, pulleys, and the like, may generally be advantageously mounted in this manner. I do not, therefore, wish to be limited except as indicated by the subjoined claims.

I claim:

1. In combination, a shaft, an element rotatable thereon and having a cup-shaped recess in one end, an anti-friction bearing in said recess, said bearing including an outer race, an inner race, and interposed rolling members, an end wall for said recess beyond the bearing, said wall being rigid with the rotatable element and sealing a channel in which the rolling members run, and a washer outside of said end wall of substantially the same diameter as said wall and pressing on the inner race to adjust the bearing and to exclude dirt.

2. In combination, a divided support comprising end furcations, a shaft passing through the furcations of the support and having a main portion of relatively small diameter and an end portion of relatively large diameter, the portion of large diameter being of a length slightly greater than the width of the corresponding furcation, the shaft also having a non-circular head coacting with the support to prevent rotation, means for drawing the shaft longitudinally of its axis, and a rotatable element carried by the shaft and having bearings adapted to be adjusted by the longitudinal movement of the shaft.

3. In combination, a longitudinally adjustable shaft, an element rotatable about the shaft and having a recess in one end, a ball bearing housed in the recess and including an outer race, balls, and an inner race, a thin end wall pressed into the recess and against the outer race and forming a tight joint, said wall approximately covering the opening between the two races, and means engaging the inner race to force it axially of the outer race as the shaft is shifted longitudinally.

ROLAND P. PLACE.